United States Patent [19]
Nishimura

[11] Patent Number: 5,988,007
[45] Date of Patent: Nov. 23, 1999

[54] BALL SCREW APPARATUS

[75] Inventor: Kentaro Nishimura, Tokyo, Japan

[73] Assignee: THK Co., Ltd., Tokyo, Japan

[21] Appl. No.: 09/011,472

[22] PCT Filed: Jun. 23, 1997

[86] PCT No.: PCT/JP97/02155

§ 371 Date: May 20, 1998

§ 102(e) Date: May 20, 1998

[87] PCT Pub. No.: WO97/48922

PCT Pub. Date: Dec. 24, 1997

[30] Foreign Application Priority Data

Jun. 21, 1996 [JP] Japan .................................. 8-181639

[51] Int. Cl.⁶ ............................................. F16H 25/22
[52] U.S. Cl. ..................................... 74/459; 74/424.8 R
[58] Field of Search .............................. 74/424.8 R, 459

[56] References Cited

U.S. PATENT DOCUMENTS

| | | | |
|---|---|---|---|
| 477,642 | 6/1892 | Brunthaver | 74/459 |
| 2,724,284 | 11/1955 | Anderson et al. | 74/459 |
| 4,074,585 | 2/1978 | Richaud et al. | 74/424.8 R |
| 4,148,226 | 4/1979 | Benton | 74/459 |
| 5,154,091 | 10/1992 | Bianco | 74/459 |
| 5,279,175 | 1/1994 | Kasuga et al. | 74/459 |

FOREIGN PATENT DOCUMENTS

| | | |
|---|---|---|
| 36-9353 | 7/1961 | Japan . |
| 37-7107 | 4/1962 | Japan . |
| 50-121662 | 9/1975 | Japan . |
| 6-201013 | 7/1994 | Japan . |

*Primary Examiner*—Allan D. Herrmann
*Attorney, Agent, or Firm*—Nikaido Marmelstein Murray & Oram LLP

[57] ABSTRACT

A ball screw unit is provided including a screw shaft having a helical ball rolling groove on the outer peripheral surface thereof; a nut fitted about the screw shaft, having a helical load rolling groove on the inner peripheral surface thereof for forming a helical load ball path in opposing relationship with the ball rolling groove of the screw shaft, and having a ball return path along the axis thereof; a pair of end caps arranged at both ends of the nut, each end cap having change of direction paths for establishing communication between ends of the load ball path and ends of ball return path of the nut respectively; and a number of balls inserted into an endless circulation path which is formed by the load ball path, the ball return path and the change of direction paths, and disposed to circulate through the endless circulation path following the rotation of the screw shaft relative to the nut; wherein each of the change of direction paths formed on the pair of end caps includes a guide groove for guiding the balls which roll out from the load ball path in a direction different from a direction in which the ball rolling groove of the screw shaft extends, and for lifting the balls from the ball rolling groove along the inner peripheral surface of the ball rolling groove; and a ball guide hole to receive the balls lifted from the ball rolling groove by the guide groove, and guide the balls to an entrance of the ball return path of the nut.

11 Claims, 14 Drawing Sheets

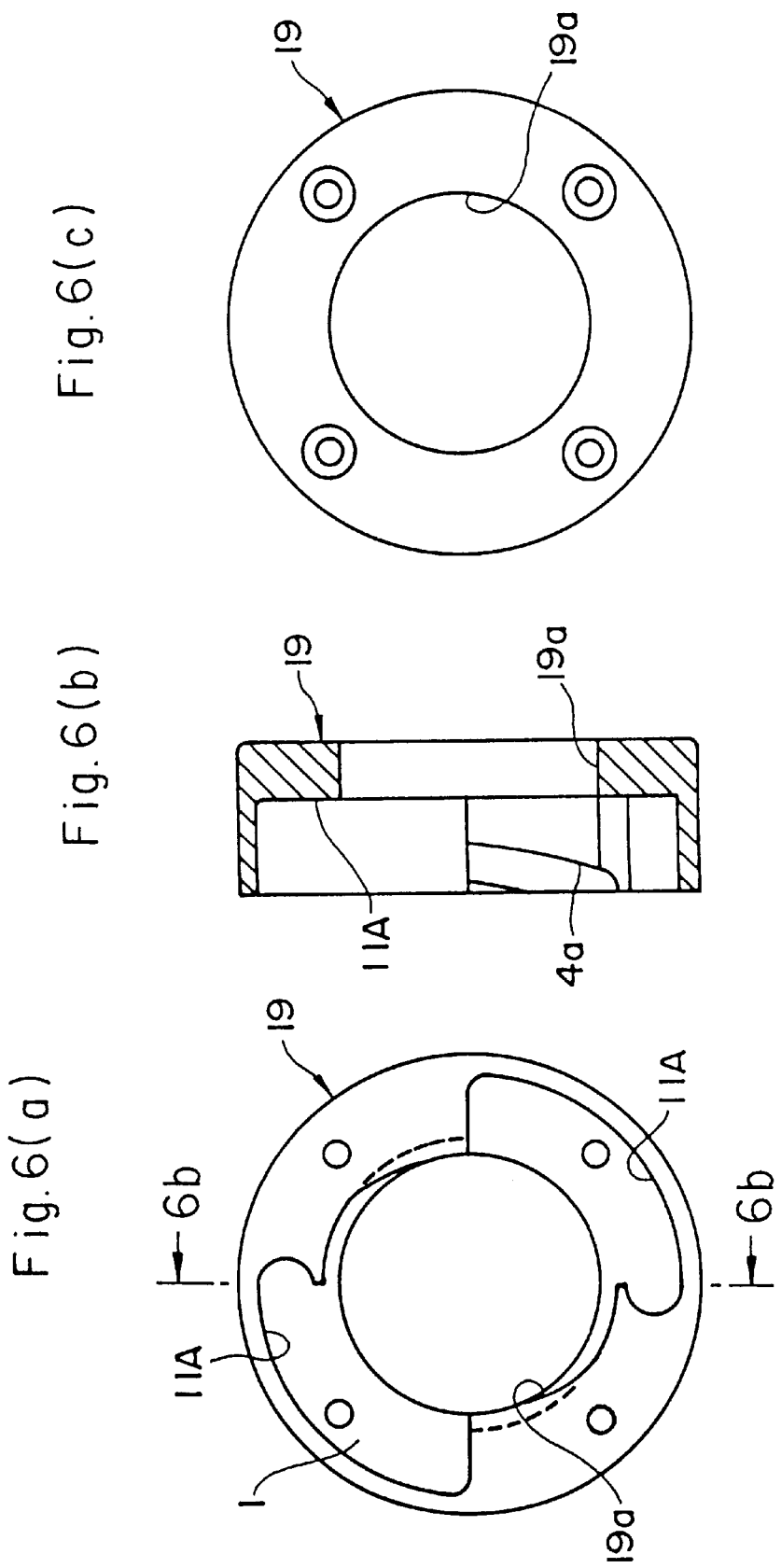

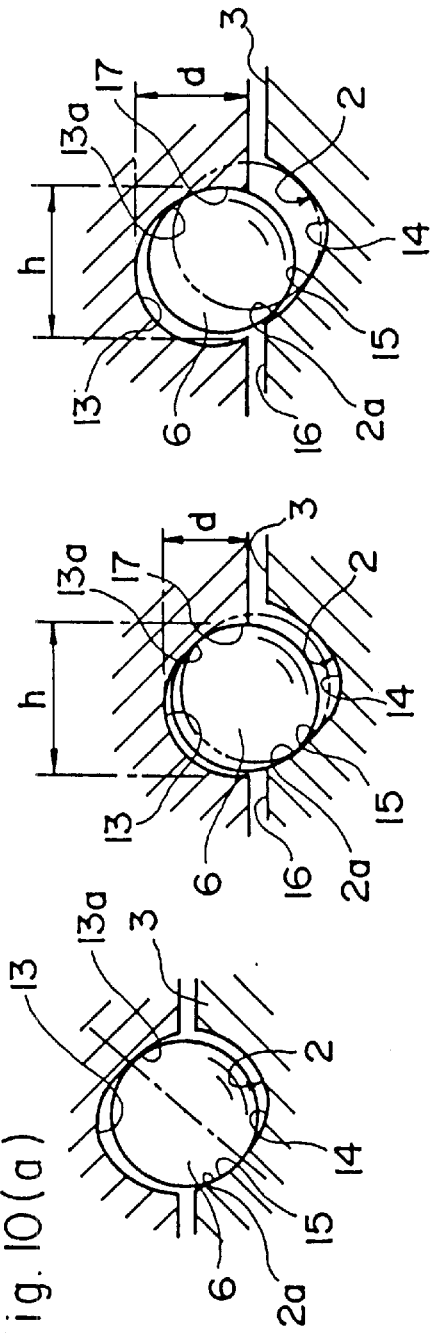
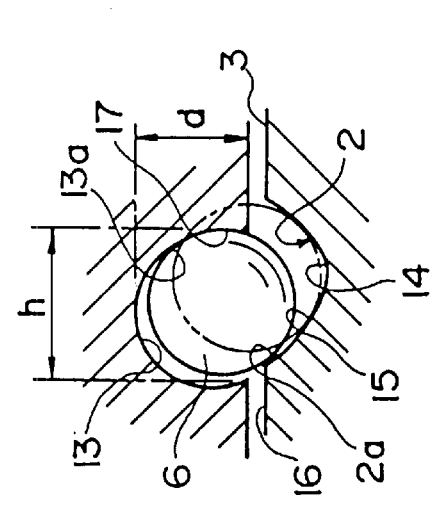
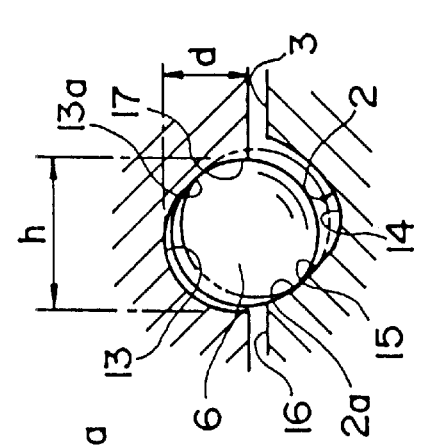
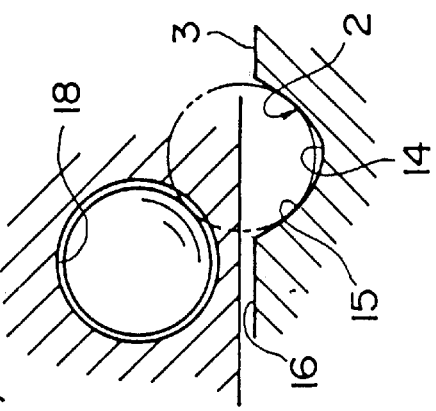
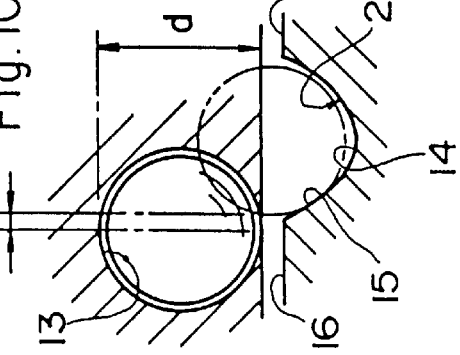
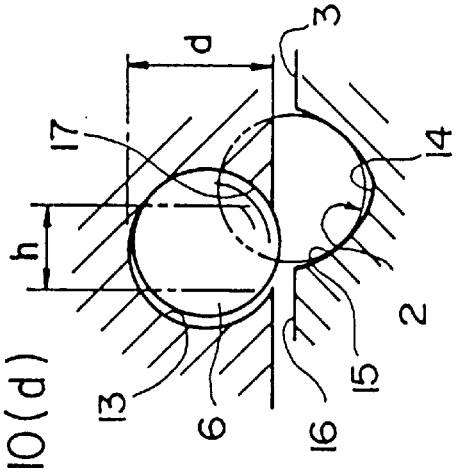

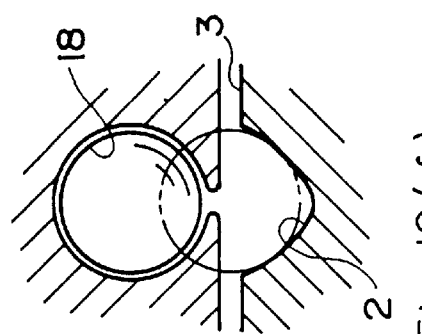
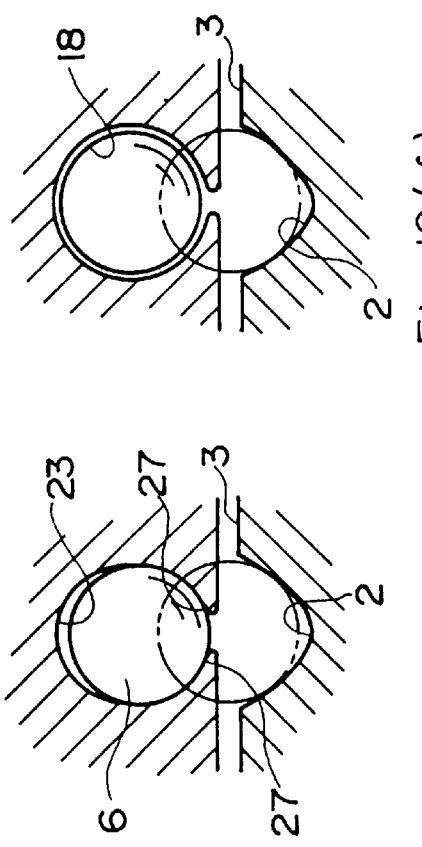
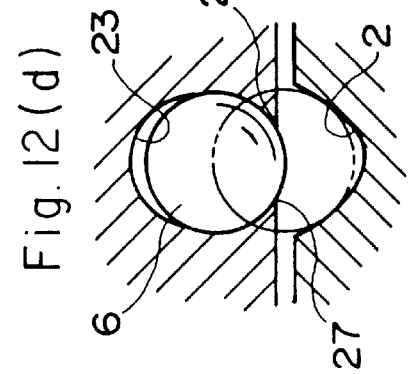
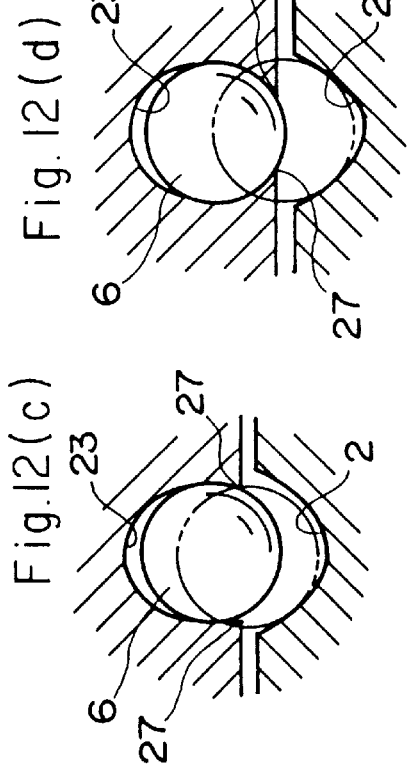
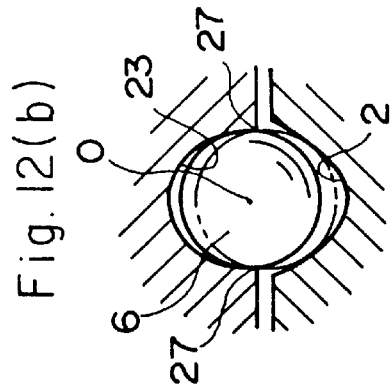
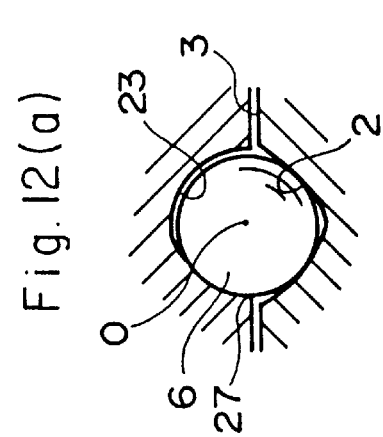

BALL SCREW APPARATUS

TECHNICAL BACKGROUND

The present invention relates to a ball screw unit comprising a screw shaft and a nut fitted about the screw shaft through a number of balls and more particularly to such type of ball screw unit that is provided with a ball circulating structure including change paths at both ends of the nut, respectively.

BACKGROUND TECHNOLOGY

Conventionally, it has been usual that the above type of ball screw unit is provided with a helical ball rolling groove formed on the outer peripheral surface of the screw shaft and a spiral load rolling groove formed on the inner peripheral surface of the nut so as to lie face to face with the ball rolling groove, a ball return path extending through the nut in the axial direction and change direction paths arranged at both ends of the nut so as to establish communication between both ends of the load ball path and both ends of the ball return path whereby the screw shaft and the nut can move relative to each other when a number of balls circulate through an endless circulation path formed of the load ball path, the ball return path and the change direction paths.

When the screw shaft and the nut move relative to each other, each of the balls which have rolled through the load ball path while bearing a load between the screw shaft and the nut comes out from the load ball path but in order to guide the ball to the ball return path by receiving the ball in each of the change direction paths, it is necessary to separate the ball from within the ball rolling groove of the screw shaft up to the outer peripheral surface of the screw shaft.

Conventionally, as a structure for separating each of the balls from the ball rolling groove of the screw shaft, it has been general that a tongue piece is inserted into the ball rolling groove at a position corresponding to the ball separating position and the ball which has come to roll in the ball rolling groove is caused to creep on the tongue piece thereby picking up the ball.

With such a ball separating structure, it is ideal to pick up the ball in the tangential direction of the ball rolling groove but in that case, the thickness of the tip of the tongue piece can not but be reduced so that there has been a problem that the strength and durability of the tip of the tongue piece are not sufficient in view of an impact which would take place at the time when the high-speed rolling ball runs on the tongue piece. On the other hand, there has also arisen another problem that when the thickness of the tip of the tongue piece is made large in consideration of the strength and durability of the tongue piece, a level difference takes place between the ball rolling groove and the tongue piece and a great impact is applied on the tongue piece at the time the ball runs on the tongue piece so that not only the tongue piece deforms due to a successive use thereof but also a collision sound generates every time when the ball runs on the tongue piece.

Meanwhile, as a means for separating the ball from the ball rolling groove of the screw shaft without using the above-mentioned tongue piece, there has been proposed a method in which the progressing direction of the ball rolled out from the load ball path is somewhat displaced with respect to the ball rolling groove of the screw shaft, the ball is separated up to the outer peripheral surface of the screw shaft by making use of the inner peripheral surface of the screw shaft and then, the ball is separated up to the outer peripheral surface of the screw shaft thereby picking up the ball within each of the change direction path (see U.S. Pat. No. 4,148,226).

FIGS. 13 and 14 show a ball screw unit disclosed in the above-mentioned United States Patent. This ball screw unit comprises a screw shaft 101 having a helical ball rolling groove 102 formed on the outer peripheral surface thereof, a nut 104 having on the inner peripheral surface thereof a helical load rolling groove 107 opposing to the ball rolling groove 102 and a ball return path 106 formed along the axis of the screw shaft 101, a pair of end caps 109, 109 which are fixed to both axial ends of the nut 104 and each of which has a change direction path 113 for establishing communication between the load rolling groove 107 and the ball return path 106 and a number of balls 100 which roll between the load rolling groove 107 and the ball rolling groove 102 while bearing a load thereon and circulate through the ball return path 106 and the change direction paths 113.

As shown in FIG. 13(b), a guide groove 108 which is continuous with the load rolling groove 107 is formed at each end of the nut 104 and the ball 100 which has been rolling on the load rolling groove 107 rolls into the change direction path 113 at each of the end caps 109. This guide groove 108 is formed in a plane normal to the axis of the screw shaft 101 and as it comes close to the change direction path from the load rolling groove, the depth thereof becomes gradually larger.

Accordingly, in the case of this ball screw unit, the direction of extension of each of the guide grooves 108 formed on the nut 104 does not coincide with the direction of extension of the ball rolling groove 102 of the screw shaft 101 and the ball 100 rolled out from the load rolling groove 107 of the nut 104 is gradually drawn near one side wall of the ball rolling groove 102 through the respective guide groove 108 and creeps up of itself up to the cylindrical outer peripheral surface 103 of the screw shaft 101 along the inner peripheral surface of the ball rolling groove 102 so that it is possible to separate the ball 100 from the ball rolling groove 103 without the use of any tongue piece.

However, there has been a problem that since the ball screw unit is provided with the guide grooves 108 at both ends of the nut 104, respectively, when the nut 104 is manufactured, it is necessary that the load rolling groove 107 be first formed with a predetermined lead angle with respect to the inner peripheral surface of the nut and then the guide grooves 108 continuous with the load rolling groove 107 be formed in a direction normal to the axis of the screw shaft which results in taking much time and labor for machining the nut 104.

Further, where each of the guide grooves 108 is formed along a direction normal to the axis of the screw shaft 101, a problem has arisen such that it is difficult to connect each of the guide grooves 108 formed on both ends of the nut 104 and each of the change direction paths 113 formed on the end caps 109.

Therefore, in the case of the conventional ball screw unit, the connection of the guide grooves 108 and the change direction paths 113 has been made possible in such a manner that as shown in FIG. 14, a substantially fan-shaped recess 105 is formed on each of the end surfaces of the nut 104 so as to allow one end of each of the guide grooves 108 to open into the recess 106 while a projection 110 capable of fitting in the recess 105 is formed on each of the end caps 109 and each of the above-mentioned change direction paths 113 is formed on the projection 110.

However, the above-described structure has had the disadvantage that the end surfaces of the nut 104 and those of the end caps 109 become complicated so that much time and labor are required for their machining and the manufacturing cost increases.

Further, where the guide groove 108 of the nut 104 is connected to the change direction path 113 of each of the end caps 109, the change direction path 113 must be formed parallel to the end surfaces of the nut 104 so that when the ball 100 is fed from the change direction path 113 on each end cap 109 to the ball return path 106 of the nut 104, the direction of rolling of the ball 100 has had to be changed by substantially 90 degrees. Consequently, a great resistance force is applied on the rolling of the ball 100 at the connection of the direction change path 113 and the ball return path 106 with the result that not only the smooth circulation of the ball 100 is hindered but also a sound of collision of one ball against another tends to generate thereby hindering the high-speed rotation of the nut 104 with respect to the screw shaft 101.

DISCLOSURE OF THE INVENTION

The present invention has been made to overcome the above-described problem and an object of the invention is to provide a ball screw unit which, when each of the balls rolled out from a load ball path is received in each of change direction paths, the unit is capable of smoothly separating the ball from a ball rolling groove of the screw shaft without using a conventional tongue piece and another object is to provide a nut used in the unit which is extremely easily machined, thereby sharply reducing the manufacturing cost.

That is, the ball screw unit of the present invention comprises: a screw shaft having a helical ball rolling groove on the outer peripheral surface thereof; a nut capable of fitting about the screw shaft through a number of balls and having on the inner peripheral surface thereof a helical load rolling groove forming a helical load ball path in opposing relationship to the ball rolling groove of the screw shaft and a ball return path extending axially therethrough; a pair of end caps arranged at both ends of the nut and provided with change direction paths, respectively, for establishing communication between the load ball path and the ball return path; and the number of balls to be inserted into an endless circulation path formed of the load ball path, the ball return path and the change direction paths so as to circulate through the latter following the rotation of the nut relative to the screw shaft, wherein the change direction path formed in each of the end caps comprises a guide groove which guides each of the balls rolled out from the load ball path toward a direction different from the direction of extension of the ball rolling groove and separates the ball from the ball rolling groove along the inner peripheral surface of the ball rolling groove and a ball guide hole which receives the ball separated from the ball rolling groove and guides it to an entrance of the ball return path of the nut.

With the above-described technical arrangement, the ball rolled out from the load ball path due to the rotation of the nut relative to the screw shaft enters the guide groove forming the change direction path. Such guide groove guides the ball in a direction different from the direction of extension for the ball rolling groove of the screw shaft so that the ball is gradually drawn near one side of the ball rolling groove and creeps up to the outer cylindrical surface of the screw shaft along the inner peripheral surface of the ball rolling groove to finally become separated from the ball rolling groove and is fed to the ball guide hole which establishes communication between the guide groove and the ball return hole.

In the above case, since the guide groove is formed on each of the end caps as a part of the change direction path, it is not necessary to form guide grooves on both ends of the nut, respectively, but it is sufficient to form only a load rolling groove with a predetermined lead angle on the inner peripheral surface of the nut.

Further, in case where such guide groove is formed only on each of the end caps and only the load rolling groove is formed on the nut, each ball which has rolled through the load ball path rolls out from the end surface of the nut along the ball rolling groove of the screw shaft so that even when each of the end surfaces of the nut is made planar so as to intersect at right angles with the axis of the nut, the ball can be easily transferred from the load ball path to the guide groove. Accordingly, the shape of the nut and that of the end caps contacting the nut can be simplified thereby reducing the manufacturing cost.

On the other hand, the ball within the guide groove becomes gradually separated from the ball rolling groove as it rolls on the inner peripheral surface of that groove so that the ball is still in the state of being in contact with the screw shaft. Accordingly, in feeding the ball from the guide groove to the tunnel-shaped ball guide hole, it is necessary to pick up the ball from the screw shaft into the ball guide hole and where such pickup operation is not performed smoothly, the ball runs against the entrance of the ball guide hole thereby hindering the smooth rolling of the ball. Thus, from such point of view, it is preferable that a pickup section which gradually covers the guide groove from both sides of the width thereof along the progressing direction of the ball rolled out from the load ball path be provided so that the ball separated from the ball rolling groove is caused to leave roll away from the screw shaft by means of the pickup section thereby receiving the ball within the guide groove.

Further, if the guide groove is of the type in which the ball rolled out from the load ball path is guided in a direction different from the direction of extension of the ball rolling groove, it does not matter whether the ball is guided in a direction displaced toward the axis of the screw shaft from the direction of extension of the ball rolling groove or the ball is guided in a direction displaced toward a direction normal to the axis of the screw shaft. However, where the ball has been guided by the guide groove in the direction normal to the axis of the screw shaft, the exit of the guide groove and the ball return hole come close to each other which results in that the ball guide hole which establishes communication between the ball guide groove and the ball return hole of the nut is required to rapidly change the direction of rolling of the ball by substantially 90 degrees so that there arises a danger of hindering the smooth rolling of the ball.

Accordingly, it is preferable that the ball rolled out from the load ball path be guided in a direction displaced toward the axis of the screw shaft from the direction of extension of the ball rolling groove. With such a structure, it is possible to cause the exit of the ball guide groove to be sufficiently separated from the entrance of the ball return hole and to form the ball guide hole extending from the ball guide groove to the ball return path to a curved path of a large radius of curvature thereby enabling the progressing direction of the ball passing through the ball guide hole to gradually change by an amount corresponding to the above-mentioned radius of curvature. Consequently, even when the ball rolls through the ball guide hole at a high speed, the ball rolls smoothly so that for example, it is advantageous when the nut rotates at a high speed with respect to the screw shaft.

Further, when the change direction path comprising the ball guide groove and the ball guide hole is formed, it is preferable to form it by bonding a pair of return plates because if it is formed by a combination of the pair of return plates, it is possible to manufacture with ease a complicatedly curved change direction path.

Still further, when such a change direction path is formed by the pair of return plates, one of the pair is preferably formed integral with the nut. Practically, each of the return plates can be molded in such a manner that after inserting a nut (as a core) into a mold, a resin material is injected into the mold so as to pad the resin material onto the nut. Thus, if the return plate is molded integral with the nut, the number of parts can be reduced to minimize the number of assembling steps so that the load rolling groove of the nut and the ball guide groove formed on the return plate can be connected continuously on the same level and the smooth rolling of the ball can be expected.

On the other hand, where the above-mentioned ball pickup section is provided, if it is arranged closer to the screw shaft than to the center of the ball rolling in the ball rolling groove, the ball rolled out from the load ball path gradually runs on the ball pickup section from on both sides of the ball progressing direction so as to enter the ball guide groove so that the ball can be separated from the ball rolling groove only by the action of the ball pickup section. In this case, it is not necessary for the ball guide groove to guide the ball in a direction different from the direction of extension of the ball rolling groove but the ball guide groove may be arranged in opposite relationship with the ball rolling groove.

BRIEF DESCRIPTION OF THE DRAWINGS

FIG. 6 (*a*) is a front view of a cover forming each of the pair of end caps shown in FIG. 5, FIG. 6(*b*) is a sectional view taken along the 6*b*—6*b* line of FIG. 6(*a*) and FIG. 6(*c*) is a rear view of the cover;

FIGS. 10(*a*) through 10(*f*) are sectional views taken along the a—a line, the b—b line, the c—c line, the d—d line, the e—e line, and the f—f line of FIG. 4;

FIGS. 12(*a*) through 12(*f*) are sectional views of the essential portion shown in FIG. 11 when taken along the lines corresponding to those shown in FIG. 4;

(Description of Reference Symbols)

1: Ball screw unit; 2: Ball rolling groove; 3: Screw shaft; 4: Load rolling groove; 5: Nut; 6: Ball; 7: Load ball rolling path; 9: Solid portion; 10: Ball return path; 11: End cap; 11A: Concave portion; 60: Line of balls; 12: Change direction path; 13: Guide groove; 13A: Ball entrance; 14: Groove bottom; 15: Inner peripheral surface of groove; 16: Outer diameter portion; 17: Ball pickup section; (0: Lead angle of screw shaft groove; (1: Angle of inclination of ball guide groove; h: Opening width; and 18: Ball guide hole.

BEST MODE FOR CARRYING OUT THE INVENTION

The ball screw unit of the present invention will be described in detail with reference to the accompanying drawings.

Figure 1:
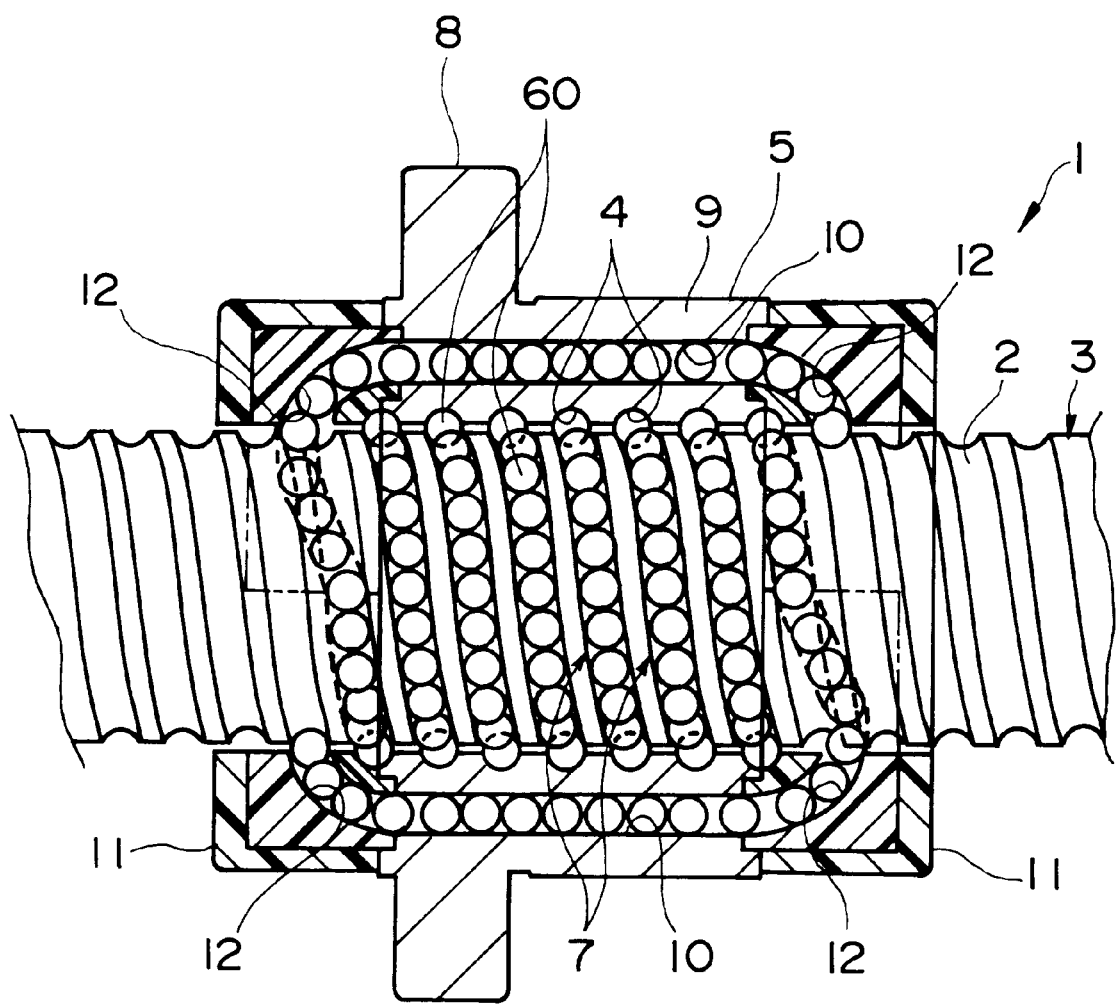
FIG. 1 is a sectional view of a ball screw unit according to one embodiment of the present invention.
Figure 2:
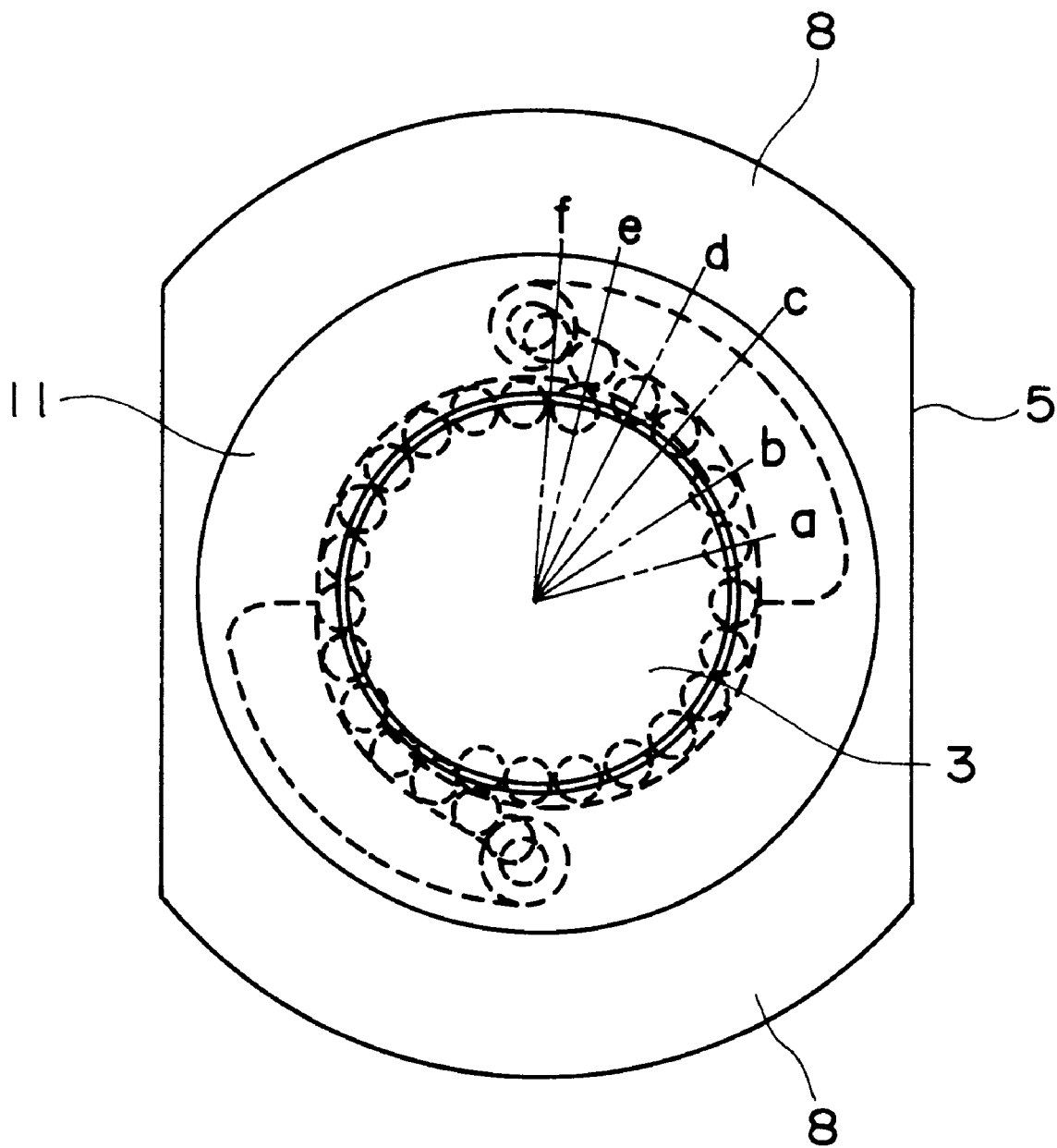
FIG. 2 is a side view of the ball screw unit shown in FIG. 1.

FIGS. 1 and 2 show one embodiment of the present invention.

As shown in FIGS. 1 and 2, the ball screw unit 1 comprises a screw shaft 3 having a helical ball rolling groove 2 on the outer peripheral surface thereof and a nut 5 having on the inner peripheral surface thereof a load rolling groove 4 corresponding to the ball rolling groove 2 whereby a helical load ball path 7 which allows a number of balls 6 to freely rotate therein is formed between the grooves 4 and 2. The nut 5 is made substantially cylindrical having a flange 8 and a solid portion 9 provided with a ball return path 10 passing therethrough in the axial direction while at the same time, a pair of end caps 11 are attached to both end surfaces of the nut 5, respectively. The end caps 11 are provided inside thereof with change direction paths 12 which establishes communication between the ends of the load ball rolling path 7 and the ends of the ball return path 10 resulting in the formation of an endless circulation path for the balls 6 by fixing the pairs of end caps 11 to the nut 5.

That is, each of the balls 6 which have rolled out from the load ball rolling path 7 due to the movement of the nut 5 relative to the screw shaft 3 is fed to the ball return path 10 through the change direction paths 12 formed inside one of the end caps 11 and after rolling through the ball return path 10, the ball is fed again into the load ball rolling path 7 through the change direction path 12 inside the other end cap 11. The ball screw unit according to the instant embodiment has two lines 60, 60 of circulating balls incorporated therein and the balls of each of the lines circulate through separate endless circulation paths, respectively. It is noted that since the circulating structures for the ball lines 60, 60 are the same, only one of them will be described below.

Figure 3:
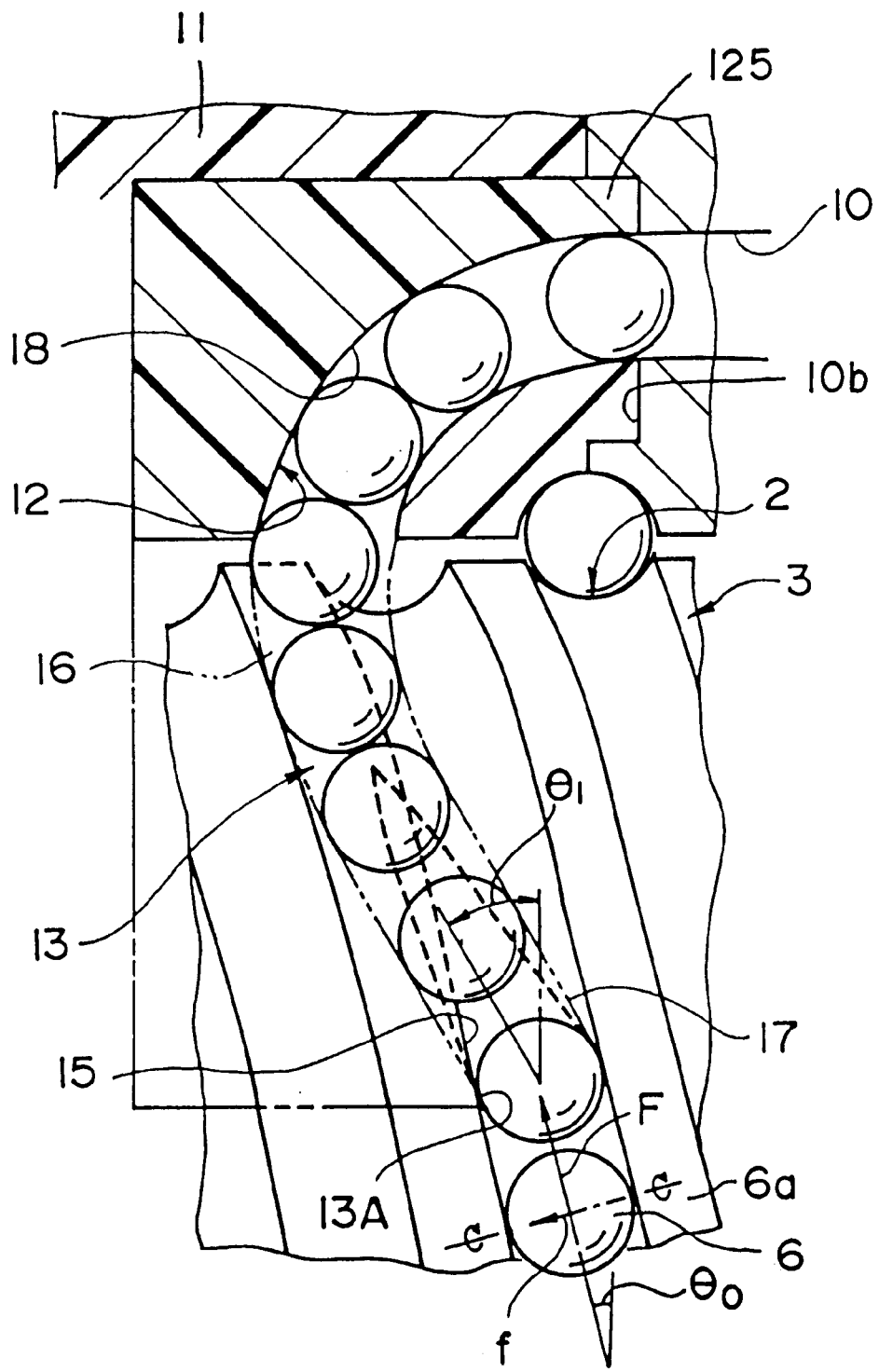
FIG. 3 is an enlarged view of an essential portion of the ball screw unit shown in FIG. 1 especially a change direction path provided in the ball screw unit.
Figure 4:
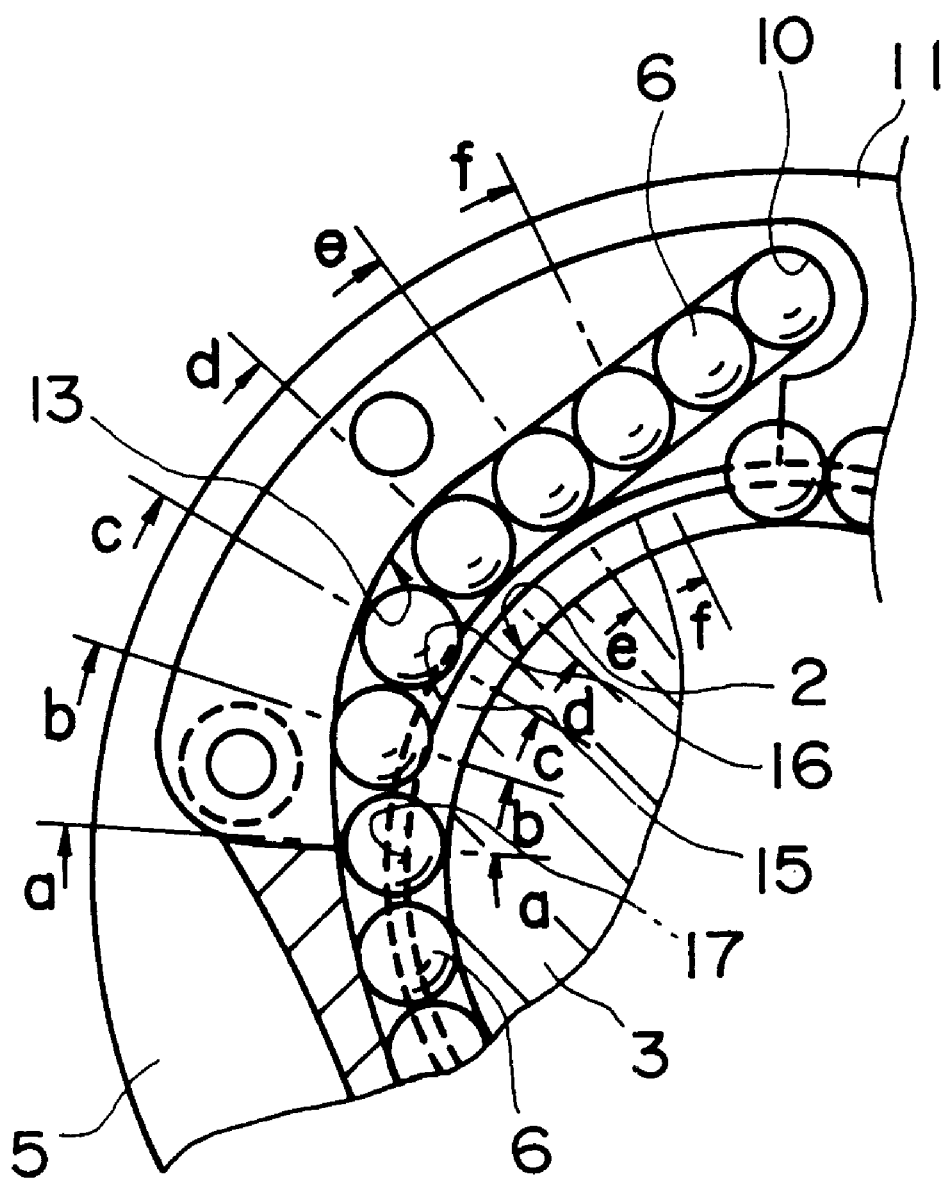
FIG. 4 is a side view of the ball screw unit shown in FIG. 3.

As shown in FIGS. 3 and 4, each of the change direction paths 12 comprises a guide groove 13 for causing each of the balls 6 pushed out from one end of the load ball rolling path 7 due to the movement of the nut 5 relative to the screw shaft 3 to become separated radially outwardly from the inside of the ball rolling groove 2 of the screw shaft 3 up to the outer diameter portion 16 and a tunnel-shaped ball guide hole 18 for guiding the ball 6 from the ball rolling groove 2 to the entrance of the ball return path 10 of the nut 5.

One end of the above-mentioned guide groove 13 is set in the same phase as the helical ball rolling groove 2 of the screw shaft 3 at an entrance 13A and is held in communication with one end of the load rolling groove 4 of the nut 5 while the other end of the guide groove 13 is connected to the ball guide hole 18 so that the ball 6 rolled out from one end of the load ball rolling path 7 after having rolled through the load rolling groove 4 of the nut 5 rolls toward the ball guide hole 18 by being guided by the guide groove 13. As shown in FIG. 3, the ball rolling groove 2 is so formed as to incline by a lead angle (0) with respect to a plane normal to the axis of the screw shaft 3, but the guide groove 13 inclines by an angle (1) of inclination larger than the lead angle (0) so that the ball 6 rolled out from the load ball rolling path 7 is guided in a direction displaced toward the axis of the screw shaft rather than a direction of extension of the ball rolling groove 2.

Further, between the guide groove 13 and the screw shaft 3, there is formed a ball pickup section 17 which gradually covers the guide groove 13 from on both sides of the width thereof along the progressing direction of the ball 6 rolled out from the load ball rolling path 7 and due to the presence of such ball guide groove 13, the ball 6 from the ball rolling groove 2 of the screw shaft 3 is caused to leave away from the screw shaft 3 so as to be received in the guide groove 13. As shown in FIG. 4, the direction in which the ball pickup section 17 guides the ball 6 at the entrance 13A of the guide groove 13 is the tangential direction of the inner peripheral surface of each of the end caps 11 which direction is the same as the direction in which the ball 6 rolls out from the load ball rolling path 7.

Figure 5:
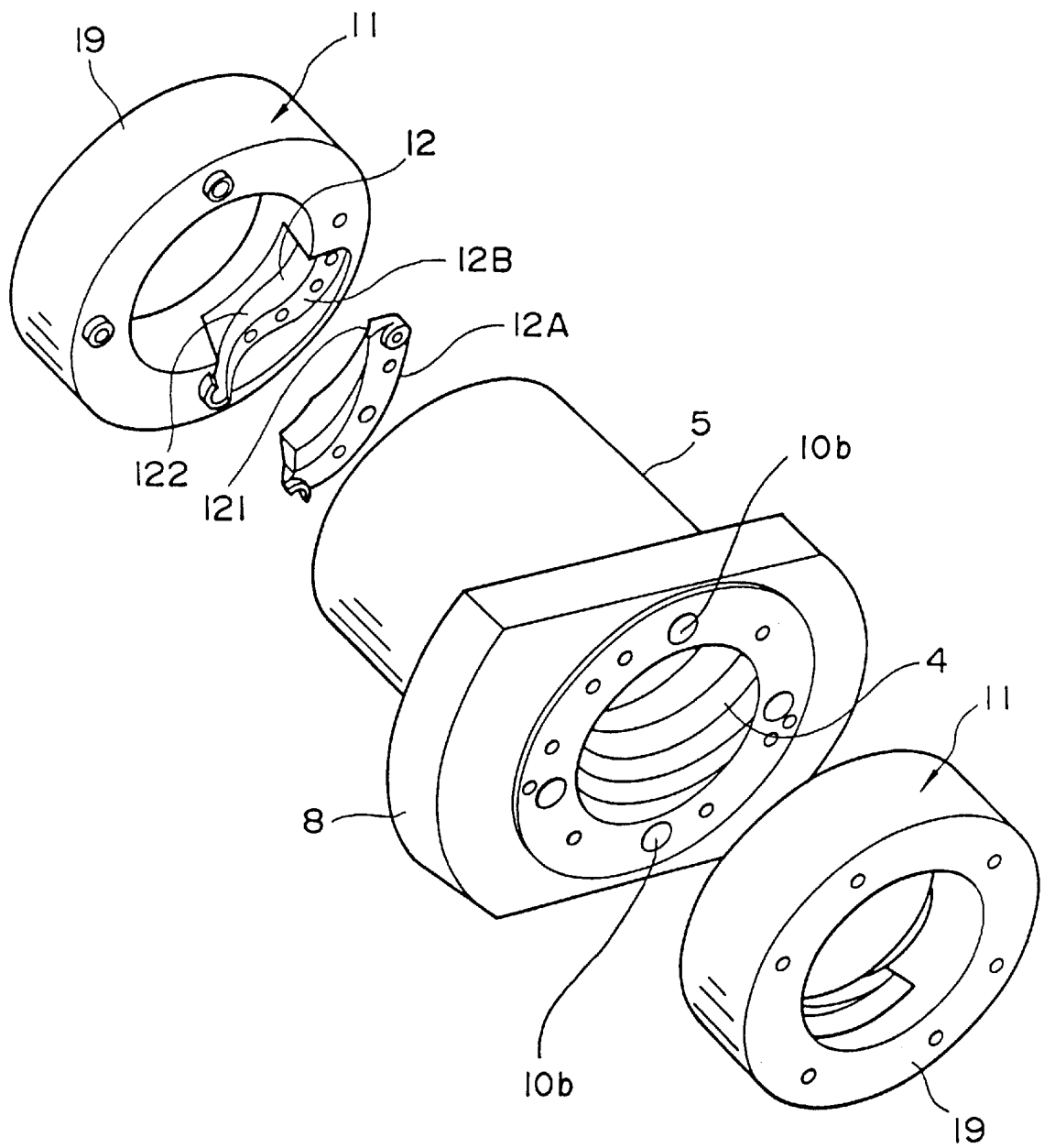
FIG. 5 is an exploded perspective view of a state in which a nut and a pair of end caps are assembled.

FIG. 5 shows the end caps 11 each of which is provided with the change direction path 12. As will be clear from this figure, each of the end caps 11 which are to be fixed to both ends of the nut 5 comprises a pair of first and second return plates 12A and 12B, respectively forming the above-mentioned change direction path 12 and a cover 19 to be fixed to one end of the nut 5 while retaining the return plates.

As shown in FIG. 6, the cover 19 is provided with a through hole 19a through which the screw shaft 3 passes as in the case of the nut 5 and two substantially fan-shaped concave portions 11A, for receiving the return plates 12A and 12B, are formed to sandwich the through hole 19a therebetween. Further, on the inner peripheral surface of the through hole 19a there is formed an introduction path 4a for guiding the ball 6 from the load rolling groove 4 of the nut 5 to the change direction path 12 comprising the return plates. The introduction path 4a is formed at the same pitch as the load rolling groove 4 of the nut 5 and somewhat larger than the load rolling groove 4 such that no radial load or axial load acts on the ball 6.

Figure 7A:
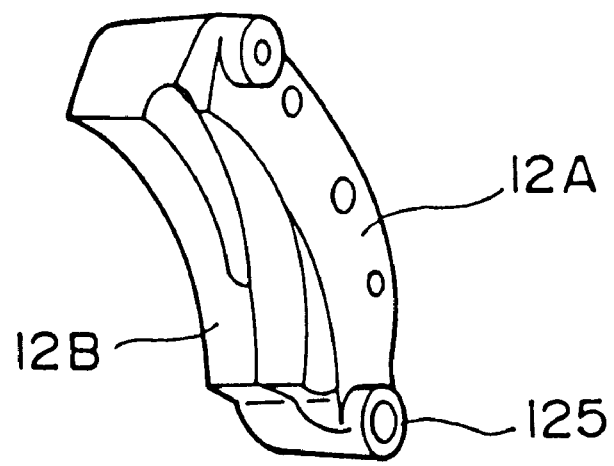
FIG. 7(*a*) is a perspective view showing how a pair of return plates forming each of the end caps shown in FIGS. 6(*a*) to 6(*c*) are assembled and FIG. 7(*b*) is a side view of the same.
Figure 7B:
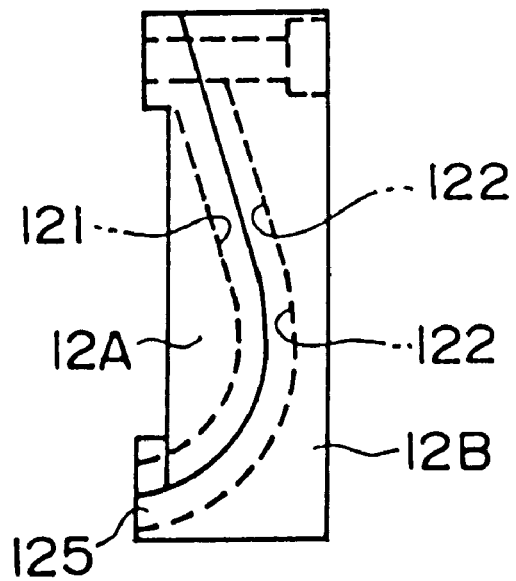

Further, as shown in FIG. 7, each of the return plates 12A and 12B to be fitted in the concave portions 11A of the cover 19 is formed of a pair of first and second plates 12A and 12B which are fitted into each of the concave portions 11A in an overlapped state and by overlapping these plates the change direction path 12 is completed. The plates 12A and 12B are formed by injection-molding of a synthetic resin material and as shown in FIGS. 8 and 9, substantially semi-circular grooves 121 and 122 which divide the change direction path 12 into halves along the longitudinal direction are formed on the surface of the first plate 12A and the rear surface of the second plate 12B, respectively.

As shown in FIG. 7, the change direction path 12 extends in the tangential direction of the through hole 19a of the cover 19 on the inner diameter side of the return plate 12 while it rises up toward the surface of the first plate 12A on the outer diameter side thereof. Accordingly, the ball 6 having rolled along the load rolling groove 4 of the nut 5 is introduced smoothly to the change direction path 12 through the introduction path 4a of the cover 19 while the rolling direction of the ball 6 is changed from the radial direction of the nut 5 to the axial direction thereof within the change direction path 12 so that the ball 6 is fed to the ball return path 10 of the nut 5 smoothly.

Figure 8A:
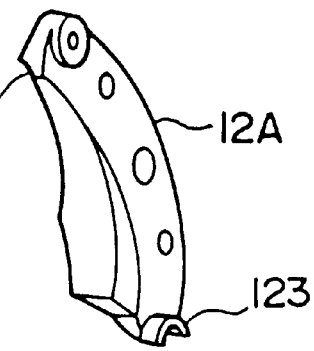
FIG. 8(*a*) is a perspective view of a first plate forming part of the return plate shown in FIG. 7, FIG. 8(*b*) is a front view of the same and FIG. 8(*c*) is a side view of the same.
Figure 8B:
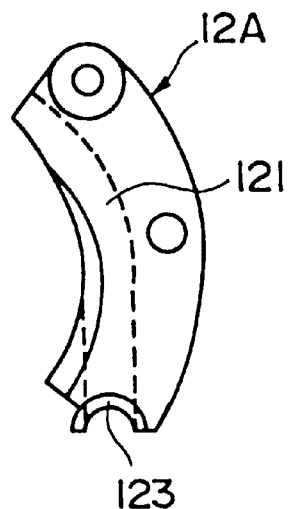
Figure 8C:
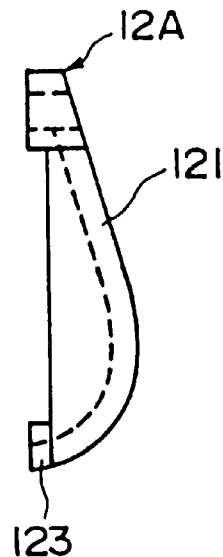
Figure 9A:
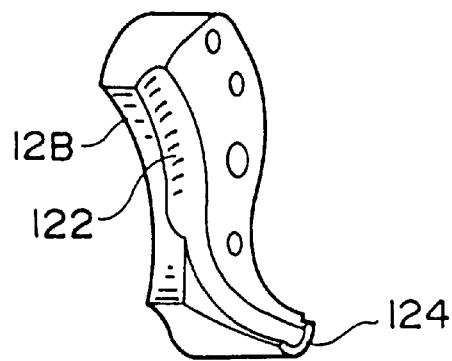
FIG. 9(*a*) is a perspective view of a second plate forming part of the return plate shown in FIG. 7, FIG. 9(*b*) is a front view of the same and FIG. 9(*c*) is a side view of the same.
Figure 9B:
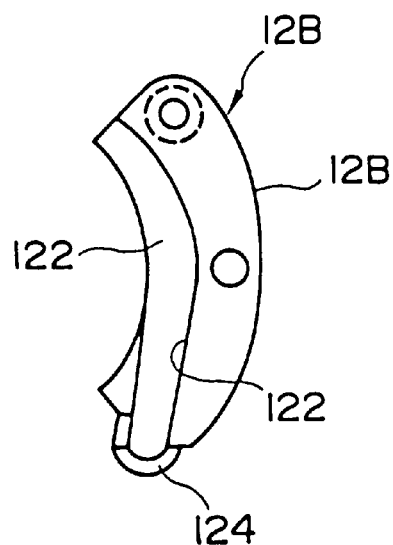
Figure 9C:
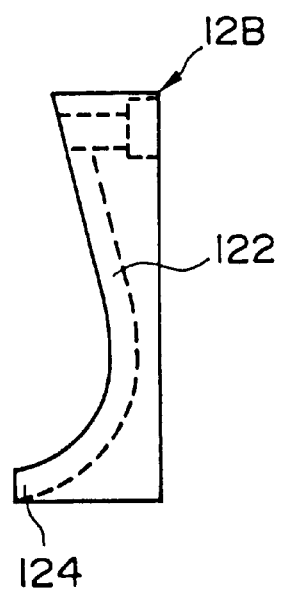

Further, as shown in FIGS. 7 through 9, on the surfaces of the first and second plates 12A and 12B, semi-circular projections 123 and 124 are formed in correspondence to the change direction path 12 so that when the first plate 12A and the second plate 12B are overlapped, these projections 123 and 124 are combined to complete a positioning boss 125 at one end of the change direction path 12.

Then, the first and second plates 12A and 12B (with the plate 12B to be inserted first) are fitted into each of the concave portions 11A of the cover 19 and the cover 19 is then fixed to the nut 5 so as to allow the first plate 12A to come into contact with the nut 5 thereby completing the fixing of the cover 12 to the nut 5. Thus, as shown in FIG. 1, the load ball rolling path 7 and the ball return path 10 are connected together so as to be held in communication with each other through the change direction paths 12 thereby completing an endless circulation path for each of the balls 6. In this case, by fitting the positioning boss 125, formed on the return plates 12a and 12B into a concave portion 10b formed at each end of the ball return path 10 of the nut, the positional relationship between the nut 5 and each of the end caps 11 is optimized and the smooth rolling of the ball 6 between the ball return path 10 and the change direction paths 12 is secured.

It should be noted that although, in the instant embodiment, the first and second plates 12A and 12B are formed separately from the cover 19, the second plate 12B which fits deep into the concave portion 11A may be made integral with the cover 19. Further, the first plate 12A may also be made integral with the nut 5 in such a manner that after the nut 5 has been inserted as a core into a mold, a synthetic resin material is padded onto each of the end surfaces of the nut 5 by injection molding. Thus, with such a structure, it is possible to continuously mold the change direction path 12 for the ball 6 and the load rolling groove 4 of the nut 5 so that no level difference takes place at the connecting portion of both of the path and the groove thereby smoothing the circulation of the ball 6.

FIGS. 10(a) through 10(f) are drawn to show a state in which the ball 6 which has rolled out from the load ball rolling path 7 passes through the guide groove 13 and is received in the ball guide hole 18 and these figures show the conditions of the ball 6 in sections taken along the a—a line, the b—b line, the c—c line, the d—d line, the e—e line and the f—f line of FIG. 4, respectively.

As shown in these figures, the above-mentioned guide groove 13 is so formed that it is semicircular so that substantially half of the ball 6 is covered at the entrance 13A while the depth of the groove 13 becomes gradually larger as it comes close to the ball guide hole 18 and the ball 6 rolled out from the load ball rolling path 7 is caused to roll away from the ball rolling groove 2 of the screw shaft 3. At the same time, at both side edges of the opening of the guide groove 13 with respect to the screw shaft 3 there is provided the above-mentioned ball pickup section 17 which is so formed that the amount (or degree) of projection of the pickup section 17 gradually increases as it extends close to the ball guide hole 18 from the entrance 13A of the guide groove 13 while the width h of the opening of the groove 13 with respect to the screw shaft gradually becomes small and finally, the pickup section 17 comes to substantially cover the guide groove 13. The contact surface of the pickup section 17 with respect to the ball 6 is in the shape of a circular arc continuous with the inner peripheral surface of the guide groove 13 and the sectional configuration of the guide groove 13 changes from semicircular to fully circular so that it becomes substantially fully circular at its connection with the entrance 13A to the ball guide hole 18.

In the case of the ball screw unit 1 according to the instant embodiment having the guide groove 13 described above, when the screw shaft 3 and the nut 5 rotate relative to each other, the ball 6 which has rolled through the load ball rolling path 7 rolls out from one end of the load ball rolling path and enters into the change direction path 12 which establishes communication between the path 7 and the ball return path 10.

The ball 6 which has entered into the change direction path 12 has its progressing direction displaced from the direction of extension of the ball rolling groove 2 toward the axis of the screw shaft 3 so that as shown in FIGS. 10(a) through 10(c), the ball 6 is moved to one side of the ball rolling groove 2 as it is pushed against the inner peripheral surface 13a of the guide groove 13 and rises up from the ball rolling groove 2 along the inner peripheral surface thereof. Then, as shown in FIG. 10(d), the ball 6 is picked up into the guide groove 13 by the pickup section 17 formed at both side edges of the opening of the guide groove 13 to become separated from within the ball rolling groove 2 and as shown in FIGS. 10(e) through 10(f), it is fed from the guide groove 13 to the ball guide hole 18.

According to the ball screw unit in the instant embodiment in which the ball 6 is transferred between the nut 5 and each of the end caps 11, only the load rolling groove 4 of a predetermined lead angle is formed on the inner peripheral surface of the nut 5 and further, since both ends of the load rolling groove 4 are held open at the axial end surfaces of the nut 5, the grinding of the load rolling groove with respect to the nut becomes extremely easy and it is possible to manufacture the nut 5 easily and at low cost.

Further, with the structure that the guide groove 13 is formed on each of the end caps 11 and the ends of the load rolling groove 4 are held open at the end surfaces of the nut 5, the ball 6 which has rolled through the load ball rolling path 7 is fed out from one of the end surfaces of the nut 5 along the ball rolling groove 2 of the screw shaft 3 so that even when the end surfaces of the nut 5 are each formed planar normal to the axis of the nut 5, it has become possible to transfer the ball 6 with ease to the guide groove on the side of each of the end caps 11. Accordingly, it becomes possible to machine the nut 5 and the end caps 11 coming into contact therewith thereby enabling them to be manufactured at still lower cost.

On the other hand, the ball rolling groove 2 of the screw shaft 3 is formed in the shape of a gothic arch by a pair of ball rolling surfaces 2a and 2b but in the process in which the ball 6 rises up from the ball rolling groove 2 of the screw shaft 3, the ball 6 is sandwiched between one of the ball rolling surfaces 2a and the inner peripheral surface 13a of the guide groove 13 opposing thereto and the ball 6 rises up from the ball rolling groove 2 as it creeps up on the ball rolling surface 2a as shown in FIGS. 10(b) and 10(c).

In the instant embodiment, at the entrance 13A of the guide groove 13, the ball 6 is in the state of being sandwiched between the rolling surface 2a of the ball rolling groove 2 and the inner peripheral surface 13a of the guide groove 13 (see FIG. 10(a)) but even within the load ball rolling path 7, the ball 6 is also in contact with the screw shaft 3, the ball rolling groove 2 and the load rolling groove 4 of the nut 5 so that the ball 6 which has rolled out from the load ball rolling path 7 comes to enter between the guide groove 13 and the ball rolling groove 2 while keeping its contact with the load ball rolling path 7. Accordingly, it is possible to smoothly transfer the ball 6 from the load ball rolling path 7 toward the change direction path 12.

Further, the ball 6 is received in the guide groove 13 while it runs on the pickup section 17 but since the pickup section 17 lifts up the ball 6 while it supports the ball 6 from both sides thereof, the ball 6 never runs against the pickup section 17 from the front and even in a case where the ball 6 is rolling at a high speed, it is not necessary to worry about the deformation and fatigue of the pickup section 17. Accordingly, the smooth circulation of the ball 6 can be maintained for a prolonged period of time. In addition, as the ball 6 within the guide groove 13 progresses through the guide groove 13 toward the ball guide hole 18, the area of contact of the ball 6 with the pickup section 17 increases gradually so that the force of the ball 6 to be applied on the pickup section 17 scatters over a wide range and it becomes possible to prevent the breakage of the pickup section 17.

Further, in the instant embodiment, the angle (1) of inclination of the guide groove 13 is set larger than the lead angle (0) of the screw shaft 3, that is, the progressing direction of the ball 6 within the guide groove 13 is displaced in the direction of axis of the guide groove 13 from the direction of extension of the ball rolling groove 2 so that as shown in FIG. 3, the ball guide hole 18 which establishes communication between the exit of the guide groove 13 and the ball return path 10 of the nut 5 can make a curved path of a comparatively large radius of curvature. The ball 6 rolling within the ball guide hole 18 comes to travel as it is pushed in sequence by the next ball that follows but if the ball guide hole 18 is formed as straight as possible, the pressure of the succeeding ball could be more efficiently transmitted thereby smoothing the movement of the ball within the ball guide hole 18. Accordingly, if the ball guide hole 18 is formed to a curved path of a larger radius of curvature so as to gradually change the progressing direction of the ball 6, it is possible to smooth the circulation of the ball 6.

Further, since the ball guide hole 18 is tunnel-shaped, it is possible to effectively prevent noises generated due to the rolling of the ball 6 from leaking outside the end caps 11.

In the instant embodiment, the progressing direction of the ball 6 rolling out from the load ball rolling path 7 is displaced toward the direction of axis of the screw shaft 3 rather than the direction of extension of the ball rolling groove 2 by setting the angle (1) of inclination of guide groove 13 larger than the lead angle (0) of the ball rolling groove 2 but if the progressing direction of the ball 6 is displaced from the direction of extension of the ball rolling groove 2, the angle (1) of inclination of the guide groove 13 may be set smaller than the lead angle (0) of the screw shaft 3. That is, if the ball 6 separates from the ball rolling groove 2 up to the outer diameter portion 16 of the screw shaft 3 as it gradually creeps up on the inner peripheral surface of the ball rolling groove 2, the angle (1) of inclination of the guide groove 13 may be set larger or smaller than the lead angle (0) of the ball rolling groove 2.

Figure 11:
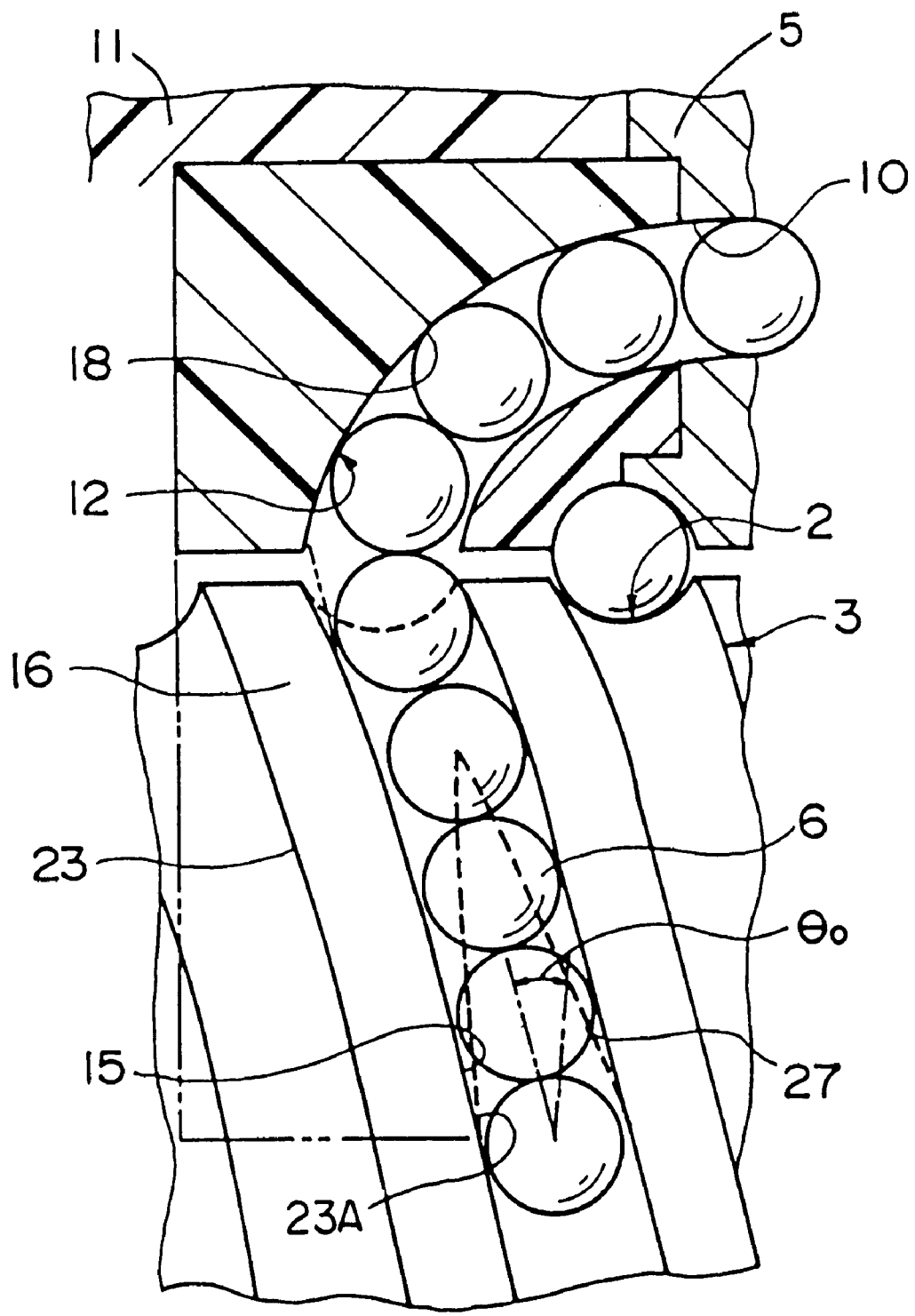
FIG. 11 is an enlarged view of an essential portion of a ball screw unit according to a second embodiment of the present invention especially a change direction path provided in the ball crew unit.
Figure 13A:
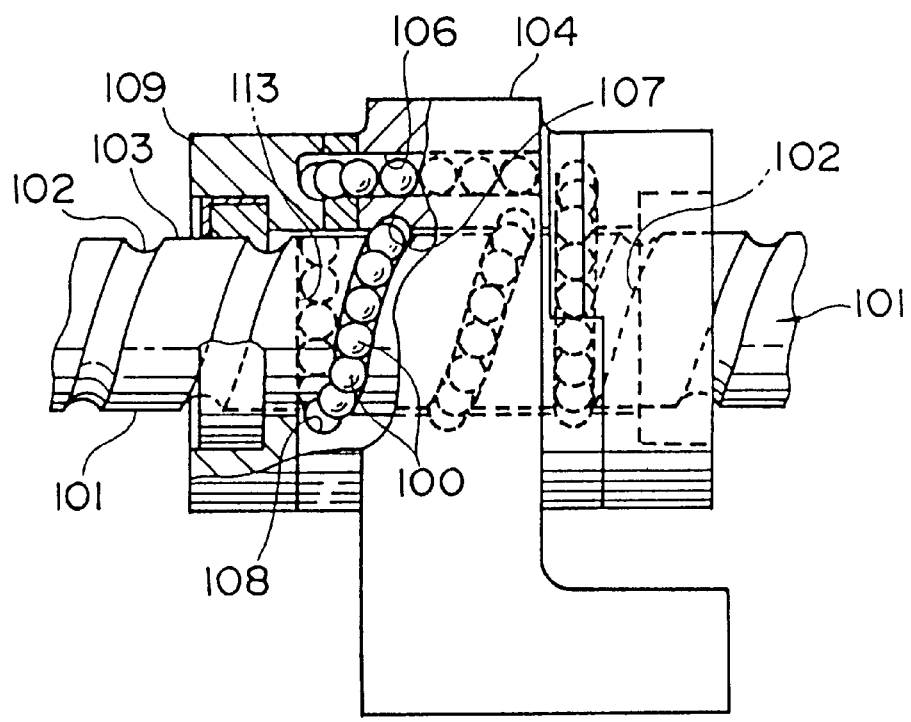
FIG. 13(*a*) is a front view of a conventional ball screw unit (or a ball nut and screw shaft assembly) disclosed in the U.S. Pat. No. 4,148,226 and FIG. 13(*b*) is a sectional view of the same.
Figure 13B:
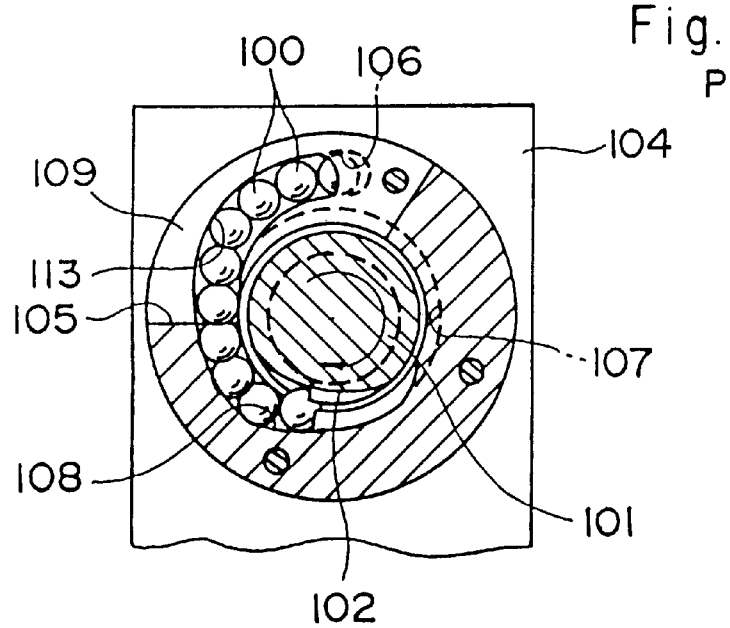
Figure 14:
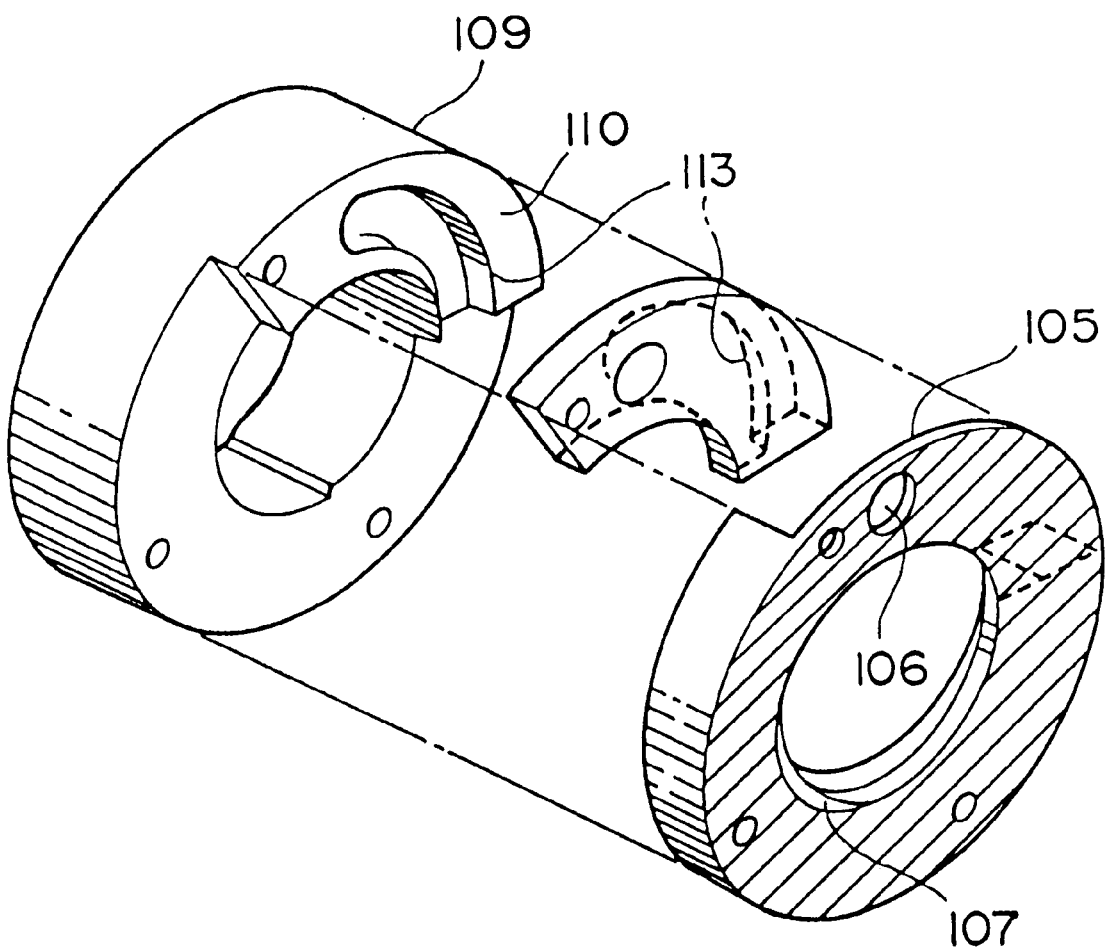
FIG. 14 is a perspective view showing a state in which a nut and end plates of the conventional ball screw unit shown in FIG. 13 are assembled.

FIGS. 11 and 12 show a ball screw unit according to a second embodiment of the present invention.

In the first embodiment, the ball 6 is received in the guide groove 13 in such a manner that the progressing direction of the ball 6 rolling out from the load ball rolling path 7 is displaced from the direction of extension of the ball rolling groove 2 so that the ball 6 is caused to rise up from the ball rolling groove 2 and is picked up by the ball pickup section 17. In contrast, in the second embodiment, the ball 6 which has been rolling in the ball rolling groove 2 is picked up to be received in a guide groove 23 by a pickup section 27 from the beginning. It should be noted that the structure other than the guide groove 23 and the pickup section 27 is the same as in those in the first embodiment and therefore, the same reference numerals and symbols are used in FIGS. 11 and 12 without giving any further description thereof.

In the instant embodiment, the guide groove 23 for guiding the ball rolling out from the load ball rolling path 7 to the ball guide hole 18 lies quite opposite to the ball rolling groove 2 and the ball 6 rolling in the guide groove 23 is guided in the same direction as the direction of extension of the ball rolling groove 2 to enter the ball guide hole 18. That is, as shown in FIG. 11, the angle of inclination of the ball guide groove 23 is the same as the lead angle (0) of the ball rolling groove 2. Accordingly, unlike the first embodiment, the guide groove 23 does not put the ball 6 to one side of the ball rolling groove 2 so that if the ball pickup section 27 is not provided, the ball 6 does not separate from the ball rolling groove 2. The depth of the guide groove 23 becomes gradually larger as it comes near the ball guide hole 18 as in the case of the first embodiment.

On the other hand, as in the case of the first embodiment, between the guide groove 23 and the screw shaft 3, there is formed the ball pickup section 27 which gradually covers the ball 6 rolling out from the load ball rolling path 7 along the progressing direction of the ball from both sides of the width of the guide groove 23 and by this pickup section 27, the ball 6 rolling in the ball rolling groove 2 is picked up to enter the guide groove 23. However, in the instant embodiment, due to the structure that the ball 6 positioned within the ball rolling groove 2 is picked up only by the ball pickup section 27, this pickup section 27 is arranged closer to the outer peripheral surface 16 of the screw shaft 3 than to the center of the ball 6 rolling in the ball rolling groove 2. Further, in order to prevent the interference between the ball pickup section 27 and the outer peripheral surface 16 of the screw shaft 3, the depth of the ball rolling groove 2 of the screw shaft 3 is somewhat smaller than in the case of the first embodiment.

FIG. 12 shows a state in which the ball 6 which has rolled out from the load ball rolling path 7 passes through the guide groove 23 and is received in the ball guide hole 18, wherein like in the case of the first embodiment, FIG. 12(a) through 12(f) show the conditions of the ball 6 at sections taken along the a—a line, the b—b line, the c—c line, the d—d line, the e—e line and the f—f line of FIG. 4, respectively.

As shown in these figures, the guide groove 23 is formed semicircular at the entrance 23A at which substantially half the ball 6 is hidden while the depth of the groove becomes gradually larger as it comes close to the ball guide hole 18 so that the ball 6 rolled out from the load ball path 7 is allowed to escape from the ball rolling groove 2 of the screw shaft 3. On the other hand, at both side edges of the opening of the guide groove 23 with respect to the screw shaft 3, there is provided the above-mentioned pickup section 27 which is so formed that the amount of projection of the pickup section 27 gradually increases as the guide groove 23 comes close to the ball guide hole 18 from the ball entrance 13A and the width of the opening of the guide groove 23 with respect to the screw shaft becomes gradually smaller until the pickup section 27 finally substantially covers the guide groove 23.

With the above structure, due to the arrangement that the pickup section 27 is formed to gradually cover the ball 6 rolled out of the load ball path 7 from both sides of the width of the guide groove 23 along the progressing direction of the ball 6 and that it projects toward the screw shaft 3 from the center of the ball 6 rolling in the ball rolling groove 2, the ball 6 which has entered the guide groove 23 gradually creeps up on the pickup section 27 from both sides of the groove and finally becomes separated from the ball rolling groove 2 to be received in the guide groove 23, as shown in FIGS. 12(a) through 12(c).

In the instant embodiment, too, the guide groove 23 forming part of the change direction path 12 is formed on each of the end caps 11 so that only the provision of the load rolling groove 4 on the inner peripheral surface of the nut 5 is sufficient and further, even when the end surfaces of the nut 5 are made planar so as to intersect at right angles with the axis of the nut, the ball 6 can be transferred from the load ball rolling path 7 on the nut to the guide groove 23 on each of the end caps 11 so that the machining of the nut and the end caps contacting the nut can be performed quite easily thereby reducing the manufacturing cost.

INDUSTRIAL AVAILABILITY

As described above, the ball screw unit according to the present invention is constructed such that the load rolling groove forming the load ball path together with the ball, rolling groove of the screw shaft is formed on the inner peripheral surface of the nut and the guide groove for separating the ball rolled out from the load ball path from the ball rolling groove of the screw shaft is formed not on the nut but on each of the end caps so that the shape of the nut and that of each of the end caps can be extremely simplified so that the manufacturing cost of the ball screw unit can be sharply reduced.

Further, when the ball from the ball rolling groove of the screw shaft is received in the change direction path, the ball can be smoothly separated from the ball rolling groove without inserting a tongue piece inside the ball rolling groove as has hitherto been practiced so that even when the nut and the screw shaft are rotated at high speed relative to each other, the circulation of the ball can be smoothly and noiselessly performed.

What is claimed is:

1. A ball screw unit comprising:
  a screw shaft having a helical ball rolling groove on the outer peripheral surface thereof;
  a nut fitted about the screw shaft, having a helical load rolling groove on the inner peripheral surface thereof for forming a helical load ball path in opposing relationship with the ball rolling groove of the screw shaft, and having a ball return path along the axis thereof;
  a pair of end caps arranged at both ends of the nut, each end cap having change of direction paths for establishing communication between ends of the load ball path and ends of the ball return path of the nut respectively; and
  a number of balls inserted into an endless circulation path which is formed by the load ball path, the ball return path and the change of direction paths, and disposed to circulate through the endless circulation path following the rotation of the screw shaft relative to the nut;
  wherein each of the change of direction paths formed on the pair of end caps comprises:
    a guide groove for guiding the balls which roll out from the load ball path in a direction different from a direction in which the ball rolling groove of the screw shaft extends, and for lifting the balls from the ball rolling groove along the inner peripheral surface of the ball rolling groove; and a ball guide hole to receive the balls lifted from the ball rolling groove by the guide groove, and guide the balls to an entrance of the ball return path of the nut.

2. The ball screw unit as described in claim 1, wherein there is provided a ball pickup section which gradually covers the guide groove from both sides of the width thereof along the progressing direction of the balls which roll out from the load ball path so that the balls lifted from the ball rolling groove are separated from the screw shaft by the pickup section so as to be received within the guide groove.

3. The ball screw unit as described in claim 1, wherein the ball guide hole is in the form of a curved path of a substantially a constant radius of curvature.

4. The ball screw unit as described in claim 1, wherein the change of direction path is formed by connecting a pair of return plates.

5. The ball screw unit as described in claim 4, wherein one of the pair of return plates is formed integral with the nut.

6. A ball screw unit comprising:

a screw shaft having a helical ball rolling groove on the outer peripheral surface thereof;

a nut fitted about the screw shaft, having a helical load rolling groove on the inner peripheral surface thereof for forming a helical load ball path in opposing relationship with the ball rolling groove of the screw shaft, and having a ball return path along the axis thereof;

a pair of end caps arranged at both ends of the nut, each end cap having change of direction paths for establishing communication between ends of the load ball path and ends of the ball return path of the nut respectively; and a number of balls inserted into an endless circulation path which is formed by the load ball path, the ball return path and the change direction paths, and disposed to circulate through the endless circulation path following the rotation of the screw shaft relative to the nut;

wherein each of the change of direction paths formed on the pair of end caps comprises:

a guide groove formed to face the ball rolling groove of the screw shaft and guide the balls which roll out from the load ball path;

a ball pickup section being so formed as to gradually cover the guide groove from both sides of the width thereof along the progressing direction of the balls which roll out from the load ball path, being arranged to project toward the screw shaft, and lift the balls from the ball rolling groove as it progresses so as to allow it to be received into the guide groove; and a ball guide hole to guide the balls lifted from the ball rolling groove of the screw shaft and being received in the guide groove, to an entrance of the ball return path of the nut.

7. A ball screw unit comprising:

a screw shaft having a helical ball rolling groove on the outer peripheral surface thereof;

a nut fitted about the screw shaft, having a helical load rolling groove on the inner peripheral surface thereof for forming a helical load ball path in opposing relationship with the ball rolling groove of the screw shaft, and having a ball return path along the axis thereof;

a pair of end caps arranged at both ends of the nut, each end cap having change of direction paths for establishing communication between ends of the load ball path and ends of the ball return path of the nut respectively; and a number of balls inserted into an endless circulation path which is formed by the load ball path, the ball return path and the change of direction paths, and disposed to circulate through the endless circulation path following the rotation of the screw shaft relative to the nut;

wherein each of the change of direction paths formed on the pair of end caps comprises:

a guide groove for guiding the balls which roll out from the load ball path in a direction different from a direction in which the ball rolling groove of the screw shaft extends, and for lifting the balls from the ball rolling groove along the inner peripheral surface of the ball rolling groove, the guide groove disposed to cause the progressing direction of the balls to incline by an angle larger than a lead angle of the ball rolling groove on the screw shaft; and a ball guide hole to receive the balls lifted from the ball rolling groove by the guide groove, and guide the balls to an entrance of the ball return path of the nut.

8. The ball screw unit as described in claim 7, wherein there is provided a ball pickup section which gradually covers the guide groove from both sides of the width thereof along the progressing direction of the balls which roll out from the load ball path so that the balls lifted from the ball rolling groove are separated from the screw shaft by the pickup section so as to be received within the guide groove.

9. The ball screw unit as described in claim 7, wherein the ball guide hole is in the form of a curved path of a substantially constant radius of curvature.

10. The ball screw unit described in claim 7, wherein the change of direction path is formed by connecting a pair of return plates.

11. The ball screw unit as described in claim 10, wherein one of the pair of return plates is formed integral with the nut.

* * * * *